April 19, 1949.  J. L. YOUNG  2,467,606
CHUCK
Filed July 1, 1946

INVENTOR
J. L. Young
By Watson, Cole, Grindle & Watson

Patented Apr. 19, 1949

2,467,606

UNITED STATES PATENT OFFICE 2,467,606

CHUCK

John Leonard Young, Whitchurch, Cardiff, Wales, assignor to West Road Co. Limited Application July 1, 1946, Serial No. 680,751
In Great Britain March 6, 1945

Section 1, Public Law 690, August 8, 1946
Patent expires March 6, 1965

5 Claims. (Cl. 279—23)

This invention relates to chucks for holding tools which have to be rotated. The chuck of this invention is of particular advantage in the case of machines for tapping nuts and other small articles which have previously been drilled but it may be used for holding machine tools other than taps.

The principal object of this invention is to provide a chuck which is of relatively simple construction and which enables the tool to be engaged therewith and disengaged therefrom by a mere relative axial movement of the tool. A more specific object of the invention is to provide a chuck for holding taps which enables the shank of the tap to be inserted into the chuck or withdrawn therefrom while the chuck is rotating.

The chuck according to this invention has a socket in which is housed a helical spring that is anchored at one end thereof to the chuck and that is adapted to receive the end of the shank of the tool to be held and, when the chuck is rotated in one direction, to grip the shank so as to effect a driving engagement between the chuck and the tool. Preferably the chuck is housed in a cover member, the leading end of which has an extension or nose portion which has a bore through which the shank of the tool may extend with slight clearance whereby the tool is guided and supported.

Figure 1:
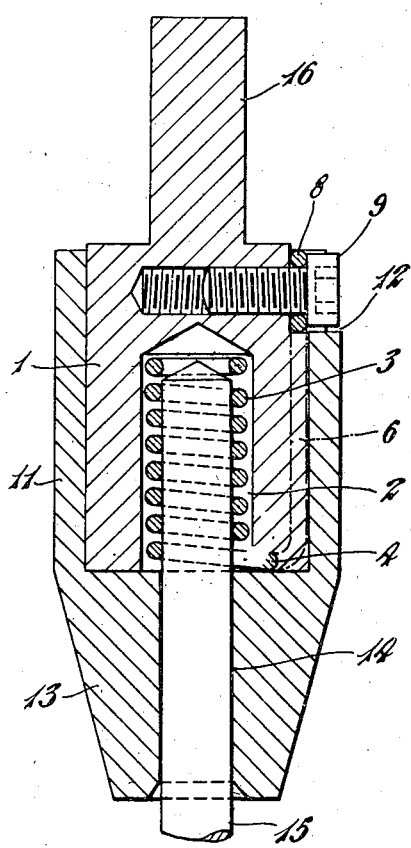
Figure 2:
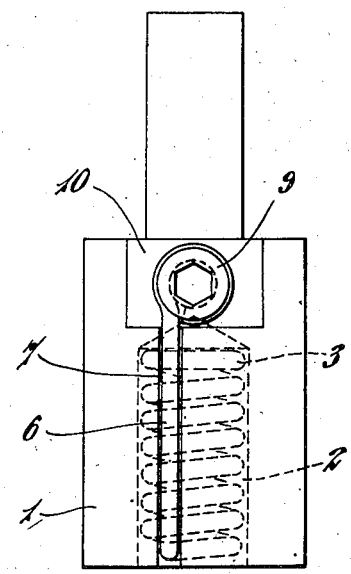
Figure 3:
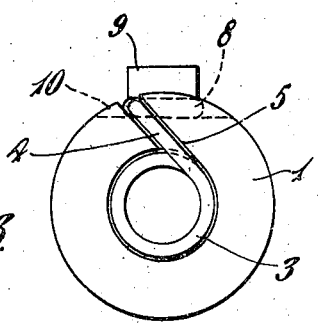

One specific form of chuck in accordance with my invention will now be described with reference to the accompanying drawing, in which Fig. 1 is a central vertical sectional view of the chuck, the chuck being shown housed in a cover member and securing the shank of a tool, and Figs. 2 and 3 are respectively a side elevational view and a bottom plan view of the chuck with the cover member omitted.

The chuck shown in the drawing comprises a cylindrical body portion 1 having a cylindrical socket 2 extending co-axially from one (the outer) end thereof. Housed within the socket 2 is a helical spring 3, and the outer end of this spring is extended to provide a tangentially extending portion 4 which is housed within a slot 5 formed in the end wall of the body portion and an axially extending portion 6 which is housed within a slot 7 formed in the side wall of the body portion 1. The free end of said axially extending portion 6 is bent to form an eye 8 and such end is secured to the body portion of the chuck within the recess 10 thereof by means of a bolt 9 which passes through the eye and is screwed into the body portion. The body portion of the chuck is received in a correspondingly shaped socket of a cylindrical cover member 11 which is secured to the body portion in any suitable way. For example, the body portion may be a light press fit within the cover member, or the two parts may be secured by means of a set screw. The inner end of the cover member 11 is formed with a recess 12 which receives the head of the spring-securing bolt 9, while the outer end of the cover member has a coned nose portion 13 having an axially aligned bore 14 through which the shank of the tool, indicated at 15, may extend with a slight clearance.

The inner end of the spring 3 is not anchored and the socket 2 in the body portion of the chuck is of such diameter that the helical spring is free to expand slightly. The internal diameter of the convolutions of the spring is so correlated with the diameter of the free end portion of the shank of the tool that when such portion of the shank is inserted into the chuck, at least some of the convolutions of the spring grip the shank. The internal diameter of the various convolutions of the spring may gradually decrease towards the inner end thereof, and such form of spring may be used to receive a cylindrical end portion of the tool shank. In such case the internal diameter of the largest convolution of the spring may be slightly greater, e. g., 0.003'' greater, than the diameter of the shank while the internal diameter of the smallest convolution may be slightly less, e. g., 0.002'' less, than the diameter of the shank. The chuck may be used with a tool having a tapering shank in which case the various convolutions of the spring may have the same internal diameter.

To engage the tool it is merely necessary to insert the free end of the shank through the guide passageway 14 formed by the nose portion 13 of the cover member and as far as possible into the spring 3 and it will be understood that, when the chuck is rotated in one or other direction, depending upon the hand of the spring, the spring will wrap itself about the shank to effect a driving engagement between the tool and the chuck. When the tool is brought down to the work a tightening torque takes place in the spring, which is caused to grip the tool firmly enough to enable it to perform its work. After use, the tool may be readily withdrawn from the stationary chuck by a pull applied thereto, this withdrawal being helped by giving the tool a slight relative rotary movement in the opposite direction whereby the spring is caused to expand and unwrap itself from the tool shank.

The invention is particularly advantageous in the tapping of nuts and other small articles since, not only can the tap be inserted into the chuck while it is rotating, but the tap can also be withdrawn from the chuck while it is rotating, the pile of tapped nuts or other articles built up on the shank of the tap during tapping providing a means whereby a pull may be applied to the tap to disengage it from the chuck without applying any appreciable drag on the tap which would tend to cause the spring to bind harder on the tap shank.

The chuck may be provided with any suitable means whereby it may be secured to the machine spindle or other driving means or may be formed integrally with the spindle or other means for driving the chuck.

In the form shown in the drawing, the chuck has at its inner end a shank 16 adapted to be secured in the chuck usually provided on a tapping or other machine.

The spring 3 is illustrated as being formed of wire of circular section but it will be understood that springs formed of wire of square or other suitable section may be employed. Springs formed of square section material are advantageous for tools of relatively large size since with such springs a greater surface of the tool shank is gripped.

I claim:

1. A chuck for holding a machine tool, said chuck comprising a body portion having a socket, and a helical spring housed within the socket, said spring being free at its inner end and being anchored at its outer end directly to the said body portion and said spring being adapted to receive the end of the shank of the tool to be held and, when the chuck is rotated in one direction, to grip the shank so as to effect a driving engagement between the chuck and the tool.

2. A chuck for holding a machine tool, said chuck comprising a body portion having a socket, a helical spring housed within the socket, said spring being free at its inner end and having at its outer end a tangentially extending portion and an axially extending portion, a slot in the outer end wall of the body portion in which said tangentially extending portion is housed, a slot in the side wall of the body portion in which said axially extending portion is housed, and means securing said axially extending portion of the spring to the body portion of the chuck.

3. In a machine for tapping nuts, a tap holder comprising a body portion having a socket, and a helical spring housed within the socket and being free at its inner end and anchored at its outer end directly to the body portion, said spring being adapted to receive the end of the tap, and, with the machine running, to grip the shank to effect a driving engagement between the holder and the tap.

4. A chuck for holding a machine tool, said chuck comprising a body portion having a socket, a helical spring housed within the socket, said spring being free at its inner end and having at its outer end an extension which is housed within the general contour of the body portion, and means securing said extension of the spring to the body portion whereby the outer end of the spring is anchored to the body portion, said spring being adapted to receive the end of the shank of the tool to be held and, when the chuck is rotated in one direction, to grip the shank so as to effect a driving engagement between the chuck and the tool.

5. A chuck as claimed in claim 4, including a cover member in which the said body portion is housed, said cover member having at its leading end a bored extension that forms a guide for the shank of the tool and that supports the shank throughout the length of the said extension.

JOHN LEONARD YOUNG.

REFERENCES CITED

The following references are of record in the file of this patent:

UNITED STATES PATENTS

| Number | Name | Date |
| --- | --- | --- |
| 1,127,129 | Warner et al. | Feb. 2, 1915 |
| 1,552,085 | Shiek | Sept. 1, 1925 |
| 2,105,330 | Pagenkopf | Jan. 11, 1938 |